United States Patent
Itoh et al.

(10) Patent No.: US 6,808,063 B2
(45) Date of Patent: Oct. 26, 2004

(54) ROLLER DEVICE AND A METHOD OF MAKING SAME

(75) Inventors: Kazuo Itoh, Kasai (JP); Kazuaki Kobayashi, Kasai (JP)

(73) Assignee: Itoh Electric Company, Limited (JP)

(*) Notice: Subject to any disclaimer, the term of this patent is extended or adjusted under 35 U.S.C. 154(b) by 0 days.

(21) Appl. No.: 10/348,082

(22) Filed: Jan. 21, 2003

(65) Prior Publication Data

US 2004/0108189 A1 Jun. 10, 2004

(30) Foreign Application Priority Data

Dec. 9, 2002 (JP) ........................................ 2002-356269

(51) Int. Cl.[7] .............................................. B65G 13/06
(52) U.S. Cl. ........................................ 198/788; 193/37
(58) Field of Search ............................. 198/788; 193/37

(56) References Cited

U.S. PATENT DOCUMENTS

| | | | | |
|---|---|---|---|---|
| 1,876,534 A | * | 9/1932 | Adams | 193/37 |
| 2,768,725 A | * | 10/1956 | Foulds | 193/37 |
| 4,315,566 A | * | 2/1982 | Greener et al. | 193/37 |
| 4,339,158 A | * | 7/1982 | Greener et al. | 384/489 |
| 4,344,218 A | * | 8/1982 | Hooper et al. | 29/516 |
| 4,793,459 A | * | 12/1988 | Forknall et al. | 193/37 |
| 5,088,596 A | * | 2/1992 | Agnoff | 198/788 |

FOREIGN PATENT DOCUMENTS

| | | | | |
|---|---|---|---|---|
| GB | 15899 | * | 7/1909 | 193/37 |
| GB | 220122 | * | 8/1924 | 193/37 |

* cited by examiner

*Primary Examiner*—Richard Ridley
(74) *Attorney, Agent, or Firm*—Wood, Phillips, Katz, Clark & Mortimer

(57) ABSTRACT

A motor-installed roller (3) has a roller body (6) and a prime mover unit (35) installed in this body and composed of a motor (33) and a reducer (34). The roller body (6) has opposite ends closed with closures (7) serving as closures and having cavities (22) formed in it. An external force is applied to an area of outer periphery of the roller body (6), the area corresponding to and facing each cavity (22) so as to plastically deform portions of the roller body and the closure (7). A punched hook engagement (65) formed in this manner serves to easy consolidation of the closure (7) such as the closure, a bearing or the like and the roller body (6) into the motor-installed roller (3), in which they are protected from moving relative to each other in tangential and axial directions, also inhibiting the closure (7) from slipping off even if subjected to vibration.

21 Claims, 14 Drawing Sheets

ROLLER DEVICE AND A METHOD OF MAKING SAME

BACKGROUND OF THE INVENTION

1. Field of the Invention

The present invention relates to a roller device for use in a conveyor or the like apparatus, and more particularly relates to the roller device whose characteristic feature resides in a structure of securing to a roller body a fixture that is accommodated therein wholly or partially.

2. Related Art

Various types of free rollers and/or motored rollers have been employed to construct the conventional conveyors or the like apparatuses. Each free roller has comprised a roller body formed as a round cylinder supported by and rotating about a shaft, and each motored roller has comprised a motor and a reducer both installed in the roller body.

In these free rollers and motored rollers, fixtures or closures for closing end openings of each roller body, as well as bearings or other constituent parts, have been fixed on or in the roller body. Usually, adhesives, set-screws, grooved pins, spring pins or the like fastening members have been used to rigidly secure such fixtures or parts to said roller body.

An example of the prior art structures is disclosed in the Japan Patent Laying-Open Gazette No. 6-171730. In this case, a fixing ring intervenes between the roller body and a closure as the fixture closing the open end thereof. A set-screw will be tightened sideways through a cap in order to firmly secure the fixture to the roller body in a wedge-like manner.

Another prior art example disclosed in the Japan Patent Re-Laying-Open Gazette No. 56-500610 proposes an annular groove to be formed in and around the closure. A circular edge of the roller body will be folded back to fit in the annular groove so as to retain the closure.

Arrays of these free rollers and/or motorized rollers are often used to transport any articles, goods or materials, suffering from mechanical vibration and shocks while they are transporting the articles. It has been observed often that holes or apertures for insertion of those set-screws or pins would possibly be widened gradually, loosening them and causing them to slip off at worst. In such an event, the roller bodies would no longer rotate smoothly, thus failing to transport the goods in an orderly manner.

If such set-screws or the like threaded fasteners are used for the described purpose, then those roller bodies and fixtures must be threaded not easily. Chip that is a metal powder or dust produced when machining such fasteners, is likely to undesirably stick to the surface of said roller body and often stray into it.

A relatively complicated structure for securing the fixture such as a closure to the roller body as proposed in the Gazette No. 6-171730 or No. 56-500610 will render its assembling works very intricate to raise manufacture cost.

SUMMARY OF THE INVENTION

An object of the present invention is to provide such a roller device that its fixture such as a closure or bearing is easily secured on its roller body with use of a fastening member, lest any vibration or other mechanical stress transmitted or imparted to the roller device should cause the fastening member to slip off.

A roller device provided herein to achieve this object may comprise a roller body, a fixture accommodated at least in part in the roller body to be secured thereto, and at least one punched hook-engagement that is formed in and between an inner periphery of the roller body and an outer periphery of the fixture. The punched hook-engagement may be produced in such a manner that the peripheries overlying one another are brought into close contact with each other at least in part so that portions of said peripheries are struck inwardly and radially of the roller body so as to cause permanent and integral plastic deformation of the said portions.

In each punched hook-engagement, such a plastically deformed portion of the roller periphery fits in that of the fixture. These deformed portions firmly hook one another, so that the fixture is prevented from moving relative to the roller body not only in circumferential but also in axial direction thereof. Thus, it is a matter of course that the fixture held in place in this fashion is protected from slipping off.

Any set-screws or set-pins need not be used in the roller device of the invention to fasten the fixture to the roller body, making it unnecessary to prepare any apertures for those screws or the like during manufacture of the roller device. Manufacture process is thus simplified, with the number of constituent parts being reduced to lower manufacture cost.

The fixture may have at least one cavity extending axially so as to be located near the periphery thereof. Each of the plastically deformed portions constituting the punched hook-engagement may project partially or wholly into this cavity.

From another aspect of the invention, it provides a roller device comprising a roller body, a fixture accommodated at least in part in the roller body to be secured thereto, and at least one punched hook-engagement that is formed in and between an inner periphery of the roller body and an outer periphery of the fixture. The fixture may have at least one cavity extending axially inwards so as to be located near the periphery thereof. The punched hook-engagement may be produced in such a manner that the peripheries over-lying one another are brought into close contact with each other at least in part so that portions of said peripheries are struck inwardly and radially of the roller body so as to cause permanent and integral plastic deformation of the said portions, in such a fashion that each plastically deformed portion constituting the punched hook-engagement may project partially or wholly into the cavity.

Certain peripheral areas of the roller body and fixture closely inserted therein will overly and surround the cavity to be easy and ready to make plastic deformation in unison and in harmony with each other, in response to a shock or the like external force applied from the outside onto the roller body.

The cavity extending axially inwards a distance from the end face of the fixture may also extend a length tangentially thereof so as to have an elongate opening in the said face.

There is a possibility that a target point for the shock would erroneously be located slightly offset with respect to the center of cavity, circumferentially or longitudinally of the roller body, due to the cylindrical shape thereof. However, such a cavity extending or elongated in both the tangential and axial directions does ensure inward projection of the punched hook-engagement, thereby affording a reliable consolidation of the roller body and fixture.

Preferably, the number of punched hook-engagements serving as fasteners is two or more arranged at angular intervals around the roller body.

Such deformed portions as the fasteners arranged around the roller body need only to withstand distributed portions of any angular vibration imparted to this roller device. The fixture will thus be prevented well from moving relative to the roller body not only in circumferential but also in axial direction thereof. It is a matter of course that the fixture held in place in this fashion is protected from slipping off.

Each punched hook-engagement may assume a generally rectangular recess, in its outer appearance, that preferably has axial sides and tangential sides.

In this case, such axial sides inhibit the fixture from making any angular displacement relative to the roller body, with the tangential sides inhibiting the fixture from being displaced longitudinally of said roller body.

Preferably, the roller body may have a smooth inner peripheral surface and the fixture has a smooth outer peripheral surface, such that they have no irregularities such as corrugations, recesses, lugs or dimples. Surface areas of the inner and outer peripheries subject to the process of making the punched hook-engagements will be held in a close and tight contact with each other.

In such a case, any intentional irregularity need not be preformed in those peripheries prior to assembling the roller device, thus simplifying and economizing the manufacture process.

The roller device may comprise an electric motor installed in the roller body to be driven by it.

Although the motor generates and transmits vibration to the roller body and fixture, they who are consolidated in the described manner will neither displace themselves tangentially or axially, nor causing the fixture to slip off to hinder smooth rotation of the roller body.

Also preferably, the fixture may be formed of a material softer than that used to form the roller body.

An inward external force for plastically deforming them will be attenuated by the outer roller body, but remaining strong enough to deform such a softer inner fixture. Thus, a weaker force will suffice well to plastically produce the described punched hook-engagement.

From a still another aspect, the present invention will provide a method of making a roller device comprises a roller body, a fixture accommodated at least in part in the roller body to be secured thereto, and at least one punched hook-engagement that is formed in and between an inner periphery of the roller body and an outer periphery of the fixture. The method of the present invention comprises the steps of preliminarily inserting the fixture into the roller body so as to cause it to take a predetermined position in this body where the peripheries have their areas aligned and kept in contact with each other, and subsequently applying an external force inwardly in a radial direction onto the aligned areas so as to deform said areas in unison to form the punched hook-engagement.

In the punched hook-engagement produced in this way, a deformed fragment or fragments of such an area of the roller body periphery is or are fitted in that or those of the area of said fixture periphery. Thus, the fixture is rigidly united with the roller body to construct the roller device, that is free from displacement between the fixture and roller body and also free from the slipping-off of said fixture even if subjected to vibration.

Any set-screws or set-pins need no longer be used in manufacturing the roller device whose fixture is firmly adjoined to the roller body, making it unnecessary to prepare any apertures for those screws or the like during manufacture of the roller device. Manufacture process is thus simplified, with the number of constituent parts being reduced to lower manufacture cost.

The fixture used in the present method may have at least one cavity located near the periphery thereof. Each of the plastically de-formed portions constituting the punched hook-engagement may project partially or wholly into this cavity.

Certain peripheral areas of the roller body and fixture closely inserted therein in the present method will overlay and surround the cavity to be easy and ready to make plastic deformation in unison and in harmony with each other, in response to a shock or the like external force applied from the outside onto the roller body.

The cavity or cavities formed in the present method to extend axially inwards a distance from the outer end face of the fixture may also extend a proper length tangentially thereof so as to have an elongate opening in the said face.

There is a possibility that a target point for the shock would erroneously be located slightly offset with respect to the center of cavity, circumferentially or longitudinally of the roller body, due to the cylindrical shape thereof. However, such a cavity extending or elongated in both the tangential and axial directions does ensure inward projection of the punched hook-engagement, thereby affording a reliable consolidation of the roller body and fixture.

Preferably, the number of punched hook-engagements is two or more arranged at angular intervals around the roller body.

Such deformed portions as the fasteners arranged around the roller body in the present method need only to withstand distributed portions of any angular vibration imparted to this roller device. The fixture will thus be prevented well from moving relative to the roller body not only in circumferential but also in axial direction thereof. It is a matter of course that the fixture held in place in this fashion is protected from slipping off.

Each punched hook-engagement may assume a recess, in its outer appearance, that preferably has axial sides and tangential sides.

In this case, such axial sides employed in the present method inhibit the fixture from making any angular displacement relative to the roller body. The tangential sides likewise inhibit the fixture from being displaced longitudinally of said roller body, thus affording a much surer consolidation of the roller body and fixture.

Preferably, the roller body may have a smooth inner peripheral surface and the fixture has a smooth outer peripheral surface, such that they are free of any irregularities such as corrugations, recesses, lugs or dimples. Surface areas of the inner and outer peripheries will be subjected to the step of inserting the fixture so that they remain held in a close and tight contact with each other while being processed at the step of applying the external force to produce the punched hook-engagements.

In such a mode of the present method, any intentional irregularity need not be preformed in those peripheries prior to assembling the roller device, thus simplifying and economizing the manufacture process.

THE PREFERRED EMBODIMENTS

Figure 1:
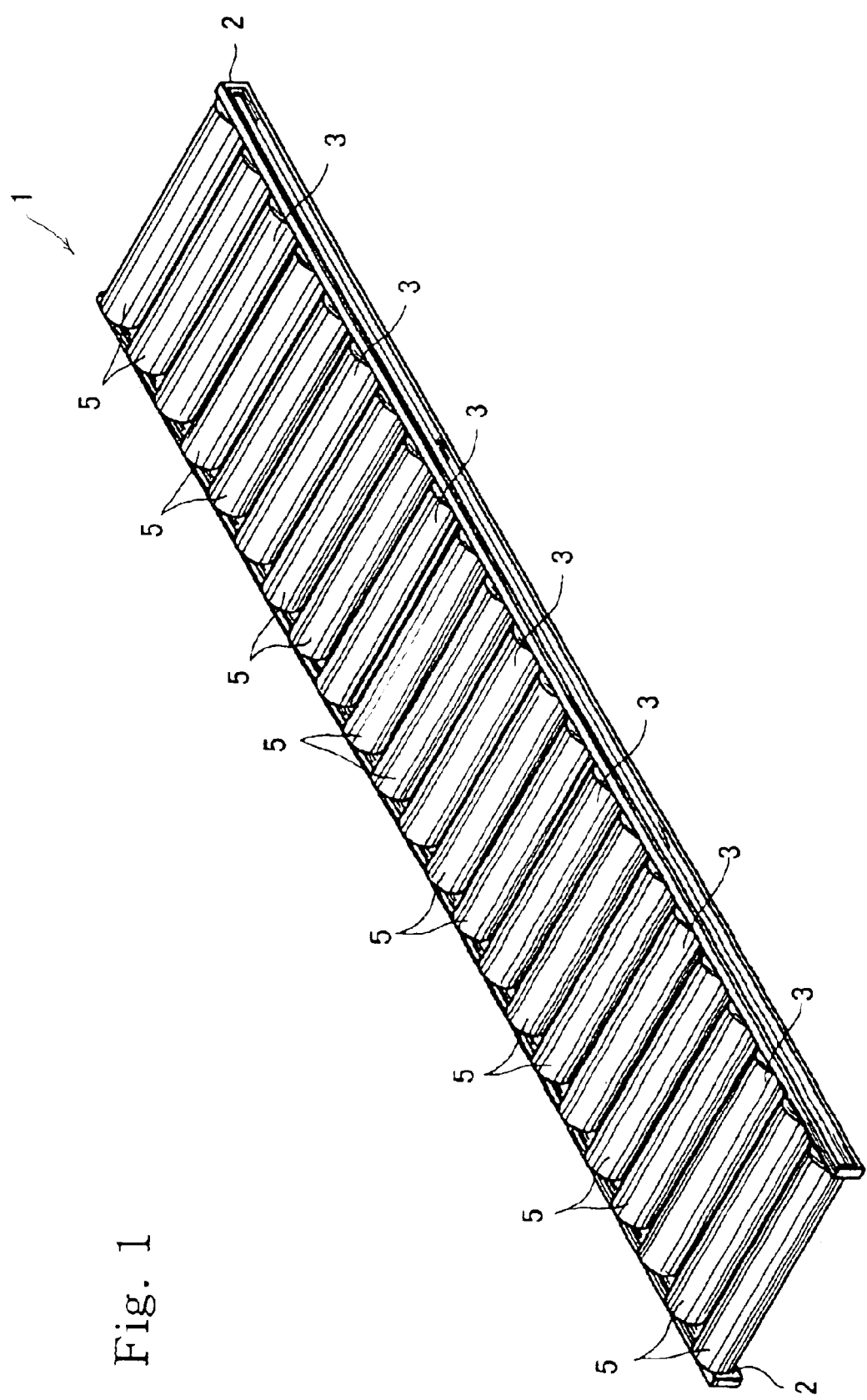
FIG. 1 is a perspective view of a transportation apparatus that is composed of motor-installed rollers in combination with free rollers, wherein each roller is a roller device provided in an embodiment of the invention.

Now, some embodiments of the present invention will be described in detail referring to the drawings.

The reference numeral 1 in FIG. 1 generally denotes a transportation apparatus. This apparatus 1 is a roller conveyor having parallel frames 2 and 2, between which a plurality of motor-installed rollers 3 and a plurality free rollers 5 are arranged side by side and alternating one another. Those motor-installed rollers 3 are disposed at regular intervals in a direction in which any articles are transported. Each motor-installed roller 3 intervenes between the couples of the free rollers 5.

Figure 2:
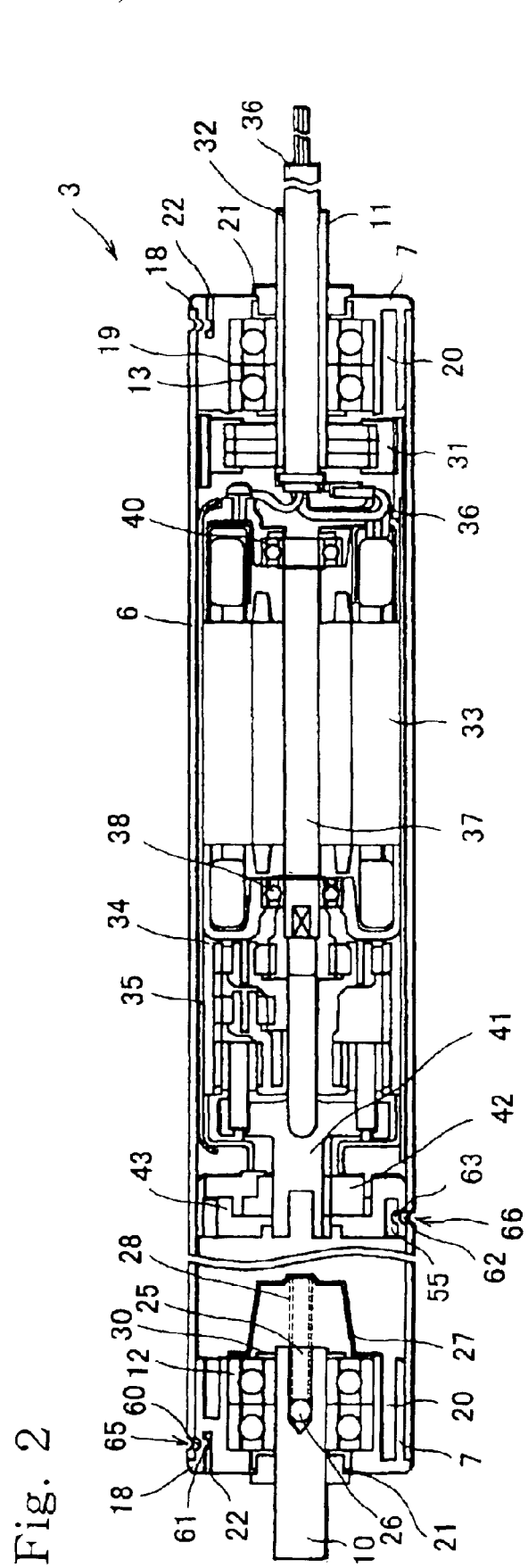
FIG. 2 is a cross section of the motor-installed roller.

As seen in FIG. 2, the motor-installed roller 3 comprises a roller body 6, closures (viz., fixtures) 7, and shaft segments 10 and 11. The roller body 6 is a metal cylinder having opposite open ends that are closed with the respective closures 7. Each shaft segment 10 and 11 penetrating the closure 7 is supported by a bearing 12 or 13 so as to rotate in situ.

Figure 3:
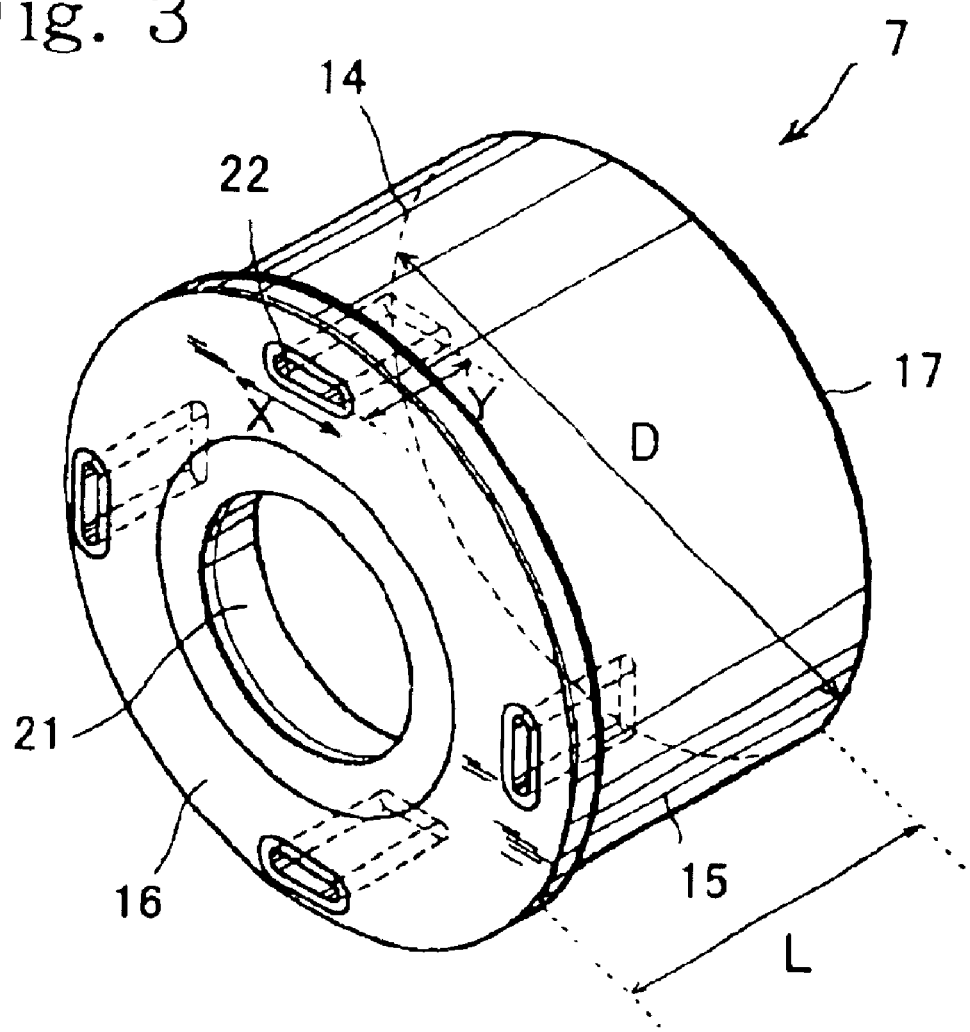
FIG. 3 is a frontal perspective view of an example of a closure incorporated as the fixture in the motor-installed roller shown in FIG. 2.
Figure 4:
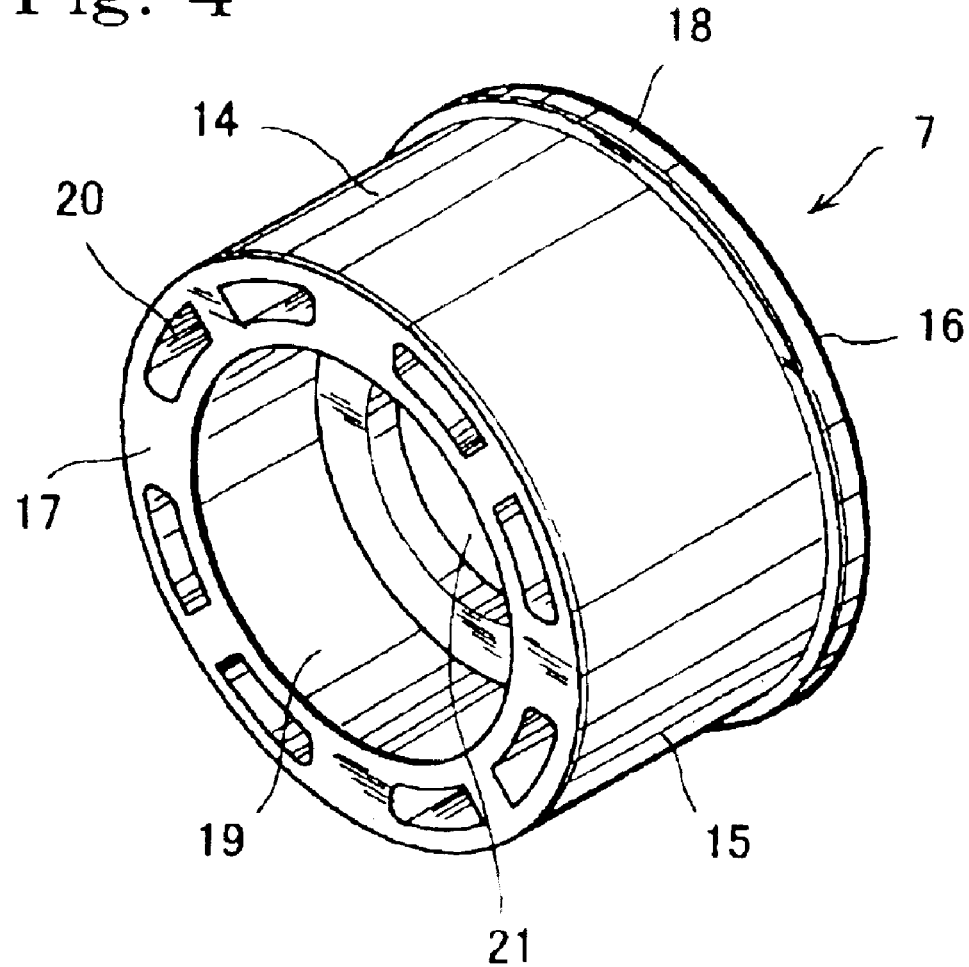
FIG. 4 is a rear perspective view of the example of the closure.

Each closure 7 is a die-cast piece of zinc-alloy (viz., ZDC), and as seen in FIGS. 3 and 4 it is composed of a fixture body 14 and a flanged portion 18. This body 14 of the closure 7 has an inner end face 17 to be disposed inside the roller body 6 and an outer periphery 15. The flanged portion 18 attached to the fixture body 14 has an outer end face 16 exposed to the outside. The closure 7 is thus a generally cylindrical member opened forwards and rearwards. A rim of the flanged portion 18 projects raidially outwards from the fixture body 14. An outer diameter of the flanged portion 18 is substantially the same as the roller body 6, although the fixture body 14 except for the flanged portion 18 is equal to the outer diameter equal to the inner diameter of the roller body 6.

As shown in FIG. 4, the closure as closure 7 has a bore 19 opened in the inner end face 17 so as to receive a bearing 12 or 13. A plurality of slots 20 is formed around the bore 19 in order to make the closure 7 lighter in weight and less expensive. This closure 7 has, in addition to a round hole 21 opened in its outer end face 16 to fit on the shaft segment, some ('four' in the illustrated example) axial cavities 22 as will be seen in FIG. 3.

The round hole 21 communicates with the bore 19 will receive the shaft segment 10 or 11 supported by the bearing 12 or 13. Each cavity 22 rectangular in transverse cross section is elongated tangentially of the outer peripheries of closure 7 and roller body 6. Each of such axial cavities 22 extends a distance inwardly from the outer face 16. For example and in detail, their width 'X' in tangential direction may be about a tenth to a fifth of the outer diameter 'D' of fixture body 14, with their depth 'Y' in axial direction being about a quarter to two fifths of the axial length 'L' of said body 14. More preferably, 'X' is about a tenth to a ninth of 'D', and 'Y' is about a fifth to two fifths of 'L'.

The four cavities 22 are arranged at regular angular intervals and near the outer periphery 15 of closure 7. Thus, they 22 are disposed close to the inner periphery of roller body 6 in which the closure 7 will be accommodated so as to be convenient to form a punched hook-engagement 61, as detailed below.

Figure 5:
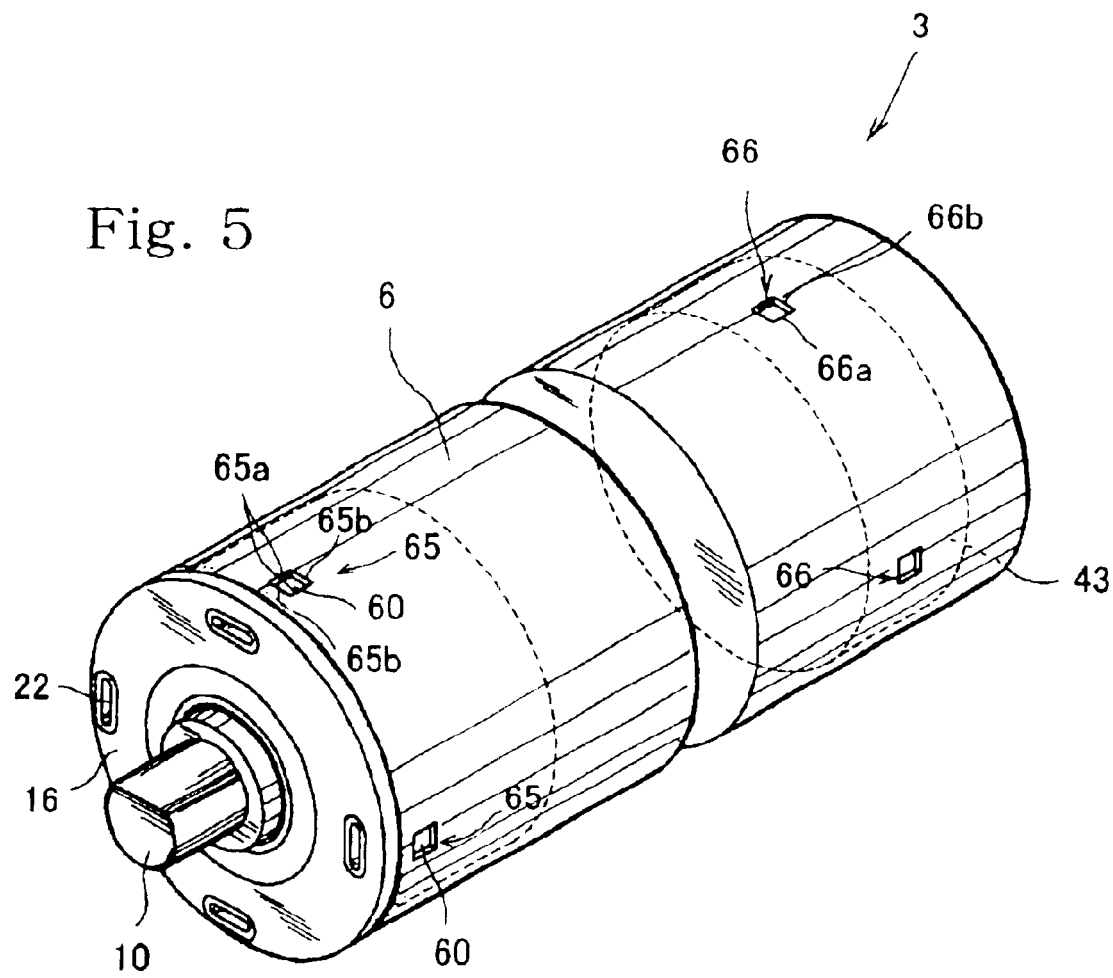
FIG. 5 is an overall perspective view of the motor-installed roller.

The shaft segment 10, having a chamfered end as shown in FIG. 5, is a rod supported by the bearing 12 to rotate freely relative to the closure 7. Fitted in an axial bore 25 of this segment 10 is a ball 26, which a coiled spring 28 urges outwardly of the roller body 6. A cap 27 attached to the inner face of bearing 12 biases outwards the shaft segment 10 by means of the spring 28 and ball 16. Thus, the shaft segment 10 having an inner flange 30 will normally and always remain urged towards its outermost position so that its flange 30 bears against the said inner face of bearing 12. However, the shaft segment 10 can be pushed a distance inwardly of the roller body 6, such that the spring 28 will permit it to spring back to its normal position when released. Owing to this structure, every motor-installed roller 3 is ready to setting in between the parallel frames 2 that have already been built up. In detail, one of the frames 2 has holes (not shown), one of them receiving each of such chamfered ends of the fixed shaft segments 10 of roller 3. The other frame 2 has other holes (not shown) each shaped to receive the other shaft segment 11 together with a power supply cable 36. After placing the other shaft segment in position in the other frame, the one segment 10 will be pushed towards the other segment and then released to spring back into the one frame. The ball 26 in the bore 25 serves to reduce friction between the shaft segment 10 and the spring 28 rotating along with the cap 27.

The other shaft segment 11 also is a rod supported rotatably by the other bearing 13 and connected to a coupling 31. A threaded outer end of this segment 11 is exposed to the outside of said roller body 6. An axial bore 32 is formed through this segment 11, keeping the interior of roller body 6 in communication with the exterior thereof. The cable 36 penetrating such a bore 32 and projecting to the outside will serve not only to supply power to the motor 33, but also to enable transmission of electric signals between a position sensor (not shown) of motor 33 and any external electric or electronic devices.

As shown in FIG. 2 and noted above, the motor-installed roller 3 has a power unit 35 composed of the motor 33 and a reducer 34, both disposed in roller body 6. This motor 33 is a brush-less motor, which is composed of magnets functioning as stators and a solenoid functioning as a rotor, and is accompanied by the sensor. A shaft 37 of this motor 33 is supported in place by further bearings 38 and 40, and one end of this shaft 37 is operatively connected by the bearing 38 to the reducer 34.

As will be seen in FIG. 2, the reducer 34 is a planetary gear train that operates to decrease the rotational speed of the motor's output from its shaft 37. An output shaft 41 of this planetary gear train 34 is connected b y an outer gear 42 to a connector (viz., fixture) 43, that is fixedly disposed in and integral with the roller body 6. Thus, the reducer 34 will decrease at first the rotational speed of the output from motor 33, before it is transmitted to the roller body 6 through the reducer's output shaft 41 and via the connector 43.

Figure 6:
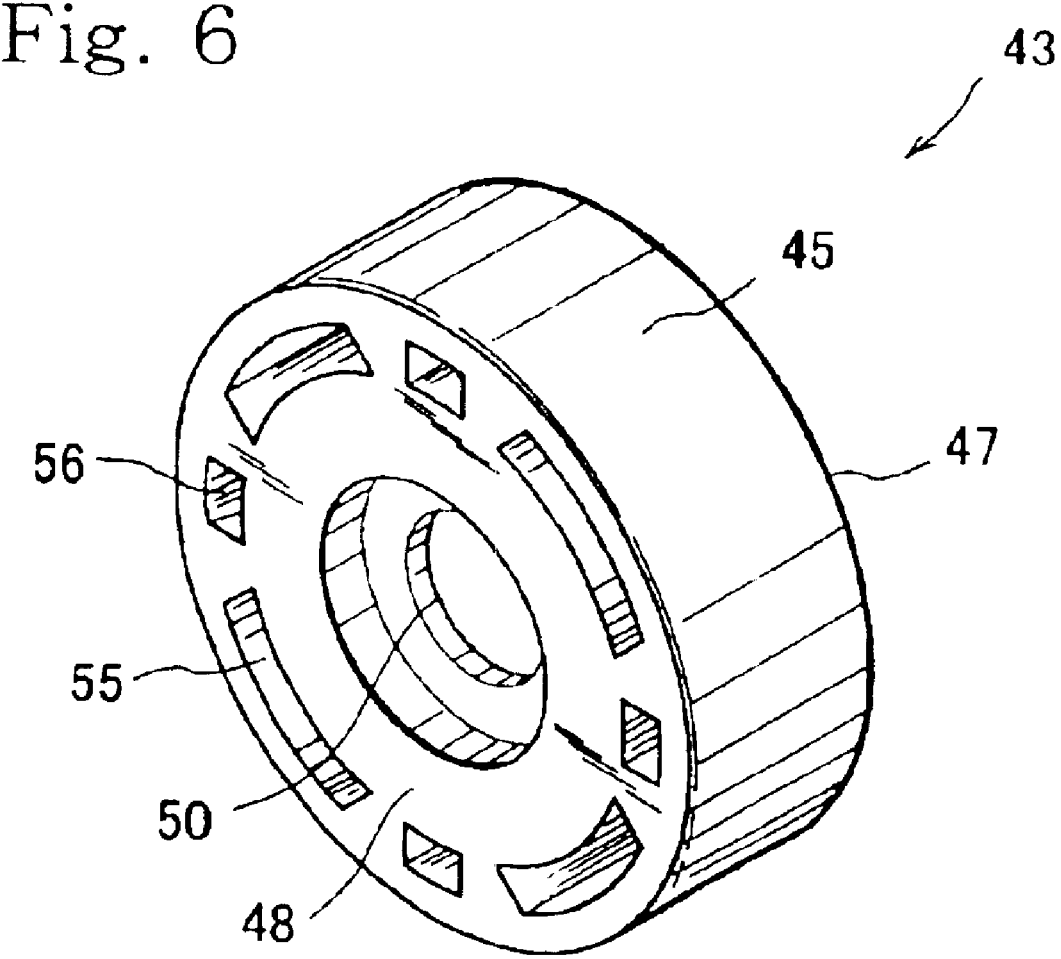
FIG. 6 is a frontal perspective view of an example of a connector incorporated as the further fixture in the motor-installed roller shown in FIG. 2.
Figure 7:
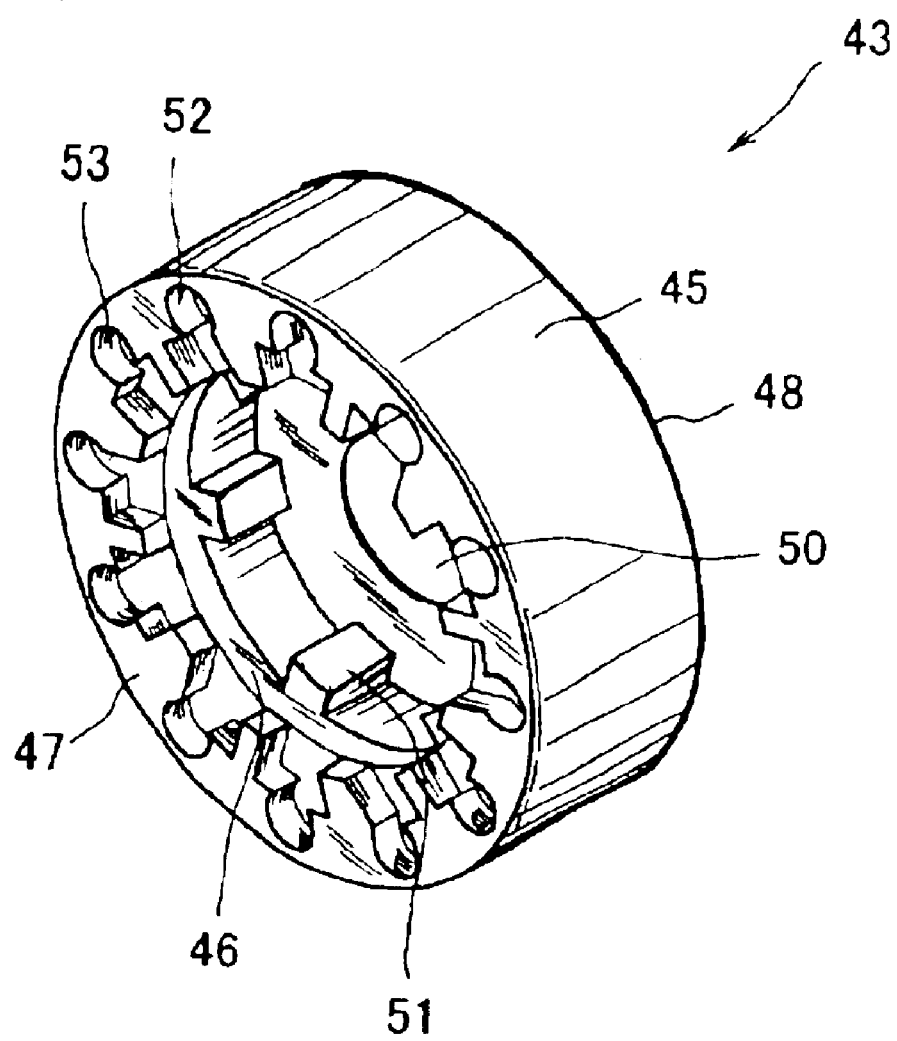
FIG. 7 is a rear perspective view of the example of the connector.
Figure 8:
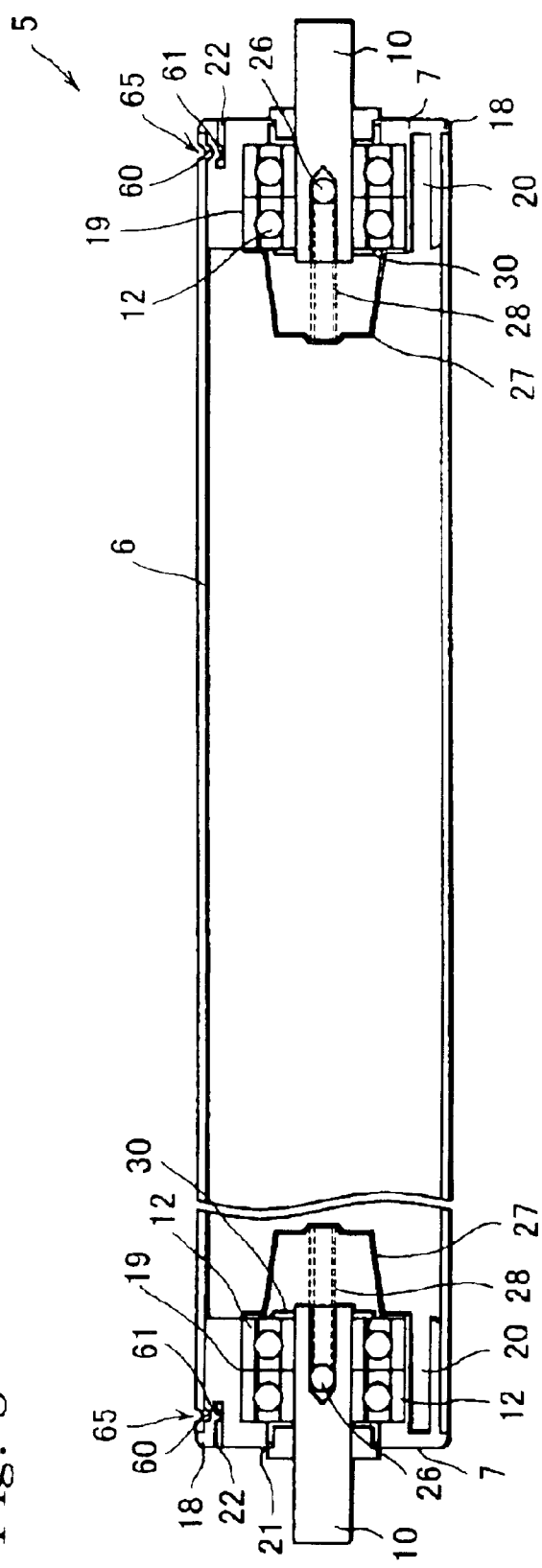
FIG. 8 is a cross section of the free roller provided in the embodiment noted above.

The connector 43 also is a die-cast zinc-alloy piece having outer and inner peripheral surfaces 45 and 46, and end faces 47 and 48, as shown inclusively in FIGS. 6 and 7. This connect or 43 having a bore 50 to the shaft is a doughnut-like shape. Teeth 51 in mesh with the outer gear 42 on output shaft 41 are formed at angular intervals on the inner periphery 46 render the connector 43 to function as an inner gear. Outer diameter of this connector 43 is substantially the same as the inner diameter of roller body 6 so as to be tightly held therein, and one of its end faces 47 faces the output shaft 41 of reducer 34. This output shaft 41 is thus inserted in the connector 43 through its end face 47 so as to the outer gear 42 engage with the teeth 51 formed on its inner periphery 46.

Recesses 52 and 53 formed in the end face 47 of connector 43 alternate one another as shown in FIG. 7 so as to receive cushion pieces arranged between the output shaft 41 and the connector 43.

Other recesses 56 and 55 (viz., axial cavities) are formed in the other end face 48 of connector 43, also alternating one another. The former recesses 56 are for accommodation of punched hook-engagements 63 to fix the connector 43 in and to the roller body 6, with the latter ones 55 serving to render said connector lighter in weight and cheaper in cost.

On the other hand, each of the free rollers 5 resembles such a motor installed roller 3 in its appearance, and has its roller body 6 having opposite ends similarly closed with closures 7. Shaft segments 10 and 10 each projecting out of the opposite ends of this free roller 5 are rotatingly supported in place by bearings 12, respectively.

Both the motor-installed and free rollers 3 and 5 are however characterized by the structure for fixing their roller bodies 6 either to closures 7 or to connector 28, all serving as the fixtures. Therefore, exemplified hereinafter is the structure for and a method of fixedly connecting the motor-installed roller body 6 to the closure 7.

Figure 9:
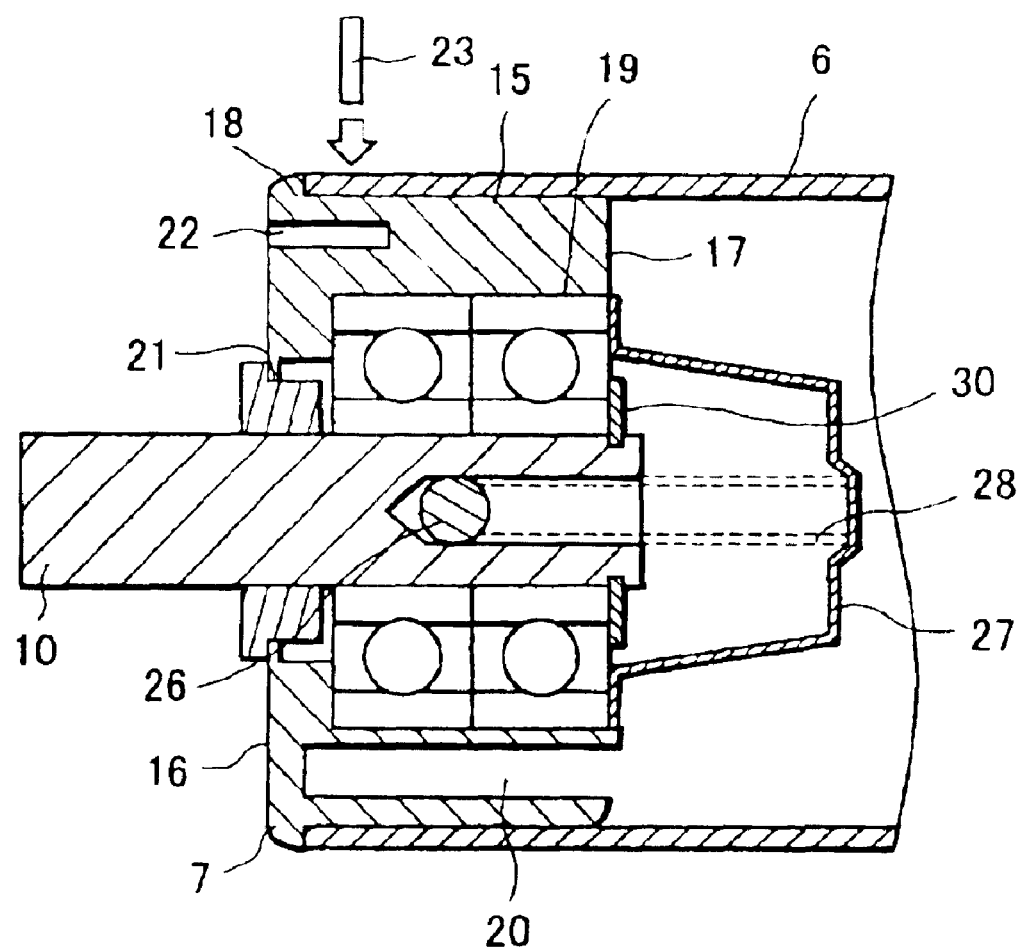
FIG. 9 is a cross-sectional view of relevant parts being at a stage of the method making the motor-installed roller as shown in FIG. 12 in the present embodiment.
Figure 10:
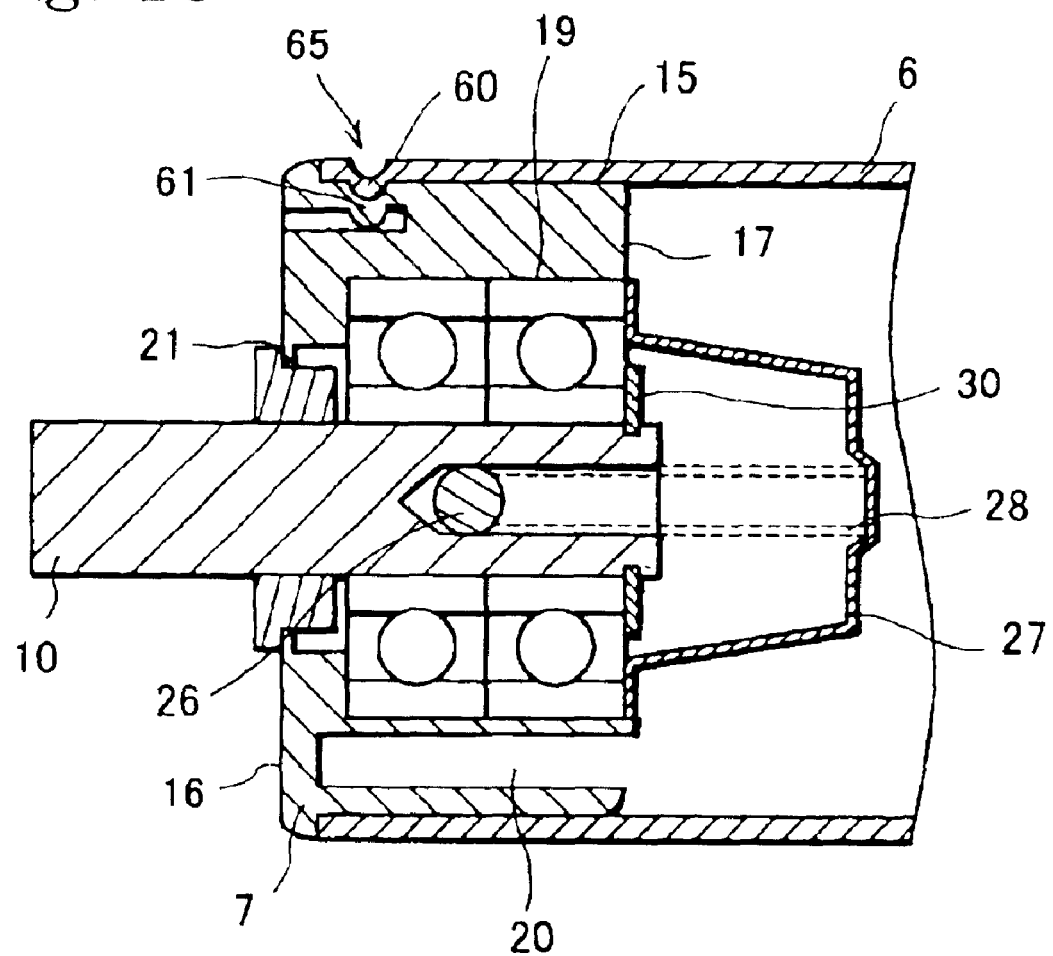
FIG. 10 is a cross-sectional view of the relevant parts at a further stage of the method.
Figure 11:
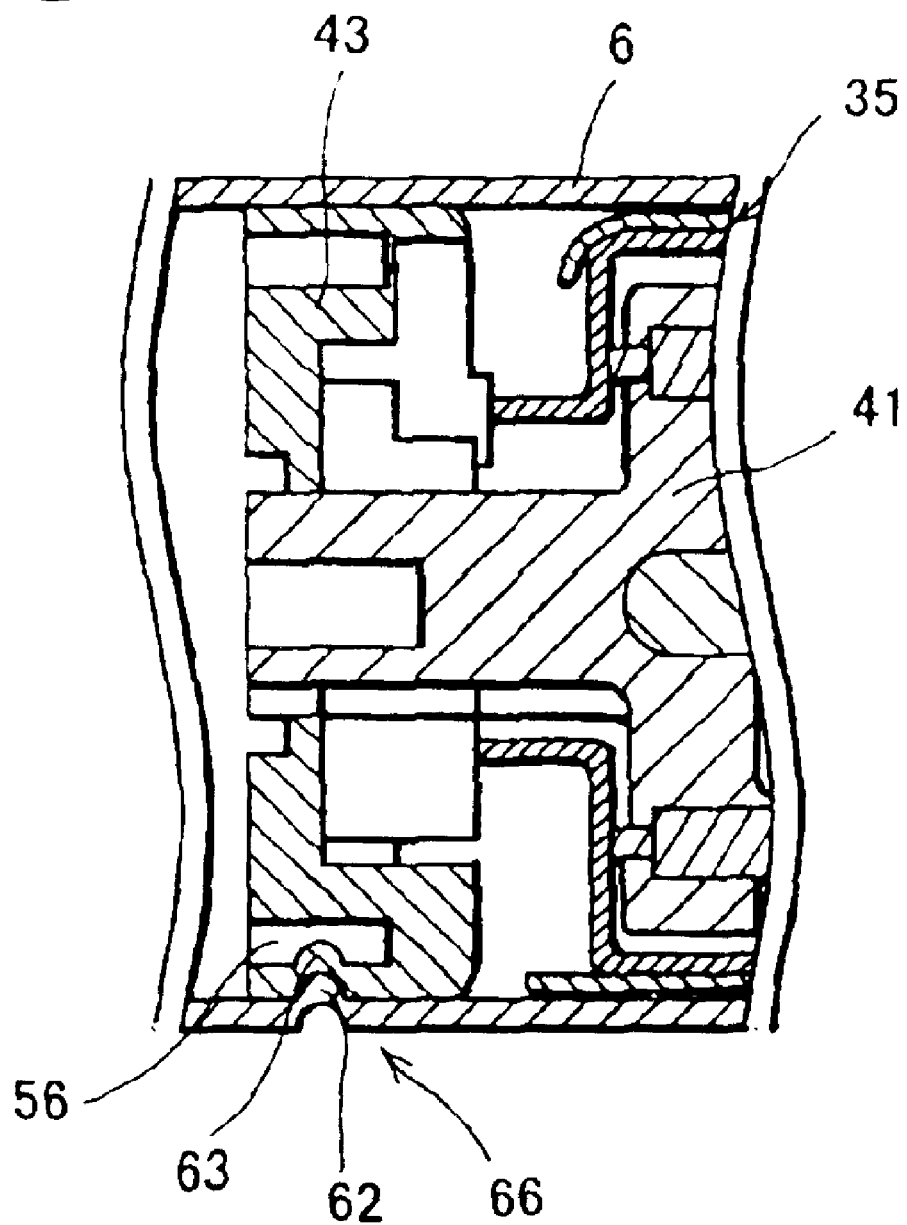
FIG. 11 is a cross-sectional view of further relevant parts at the further stage of the method.

FIGS. 9 and 10 illustrate on enlarged scale relevant parts and portions including or adjacent to the end of shaft segment 10 involved in manufacture of the motor-installed roller 3 in this embodiment. The closure 7 has its body 14 with a smooth outer peripheral surface 15, devoid of any irregularities as seen in FIGS. 3 and 4. Axial cavities 22 extend inwardly a distance from the end face 16 of the closure 7 so as to be disposed near the outer periphery 15.

In addition to those closures 7, the cylindrical roller body 6 will be prepared, which has smooth outer and inner peripheries at least its regions adjacent to its opposite ends. Then, each closure 7 will be inserted from the inner end face 17 side in the roller body 6 until its flange 18 abuts against the end of said roller body 6 as shown in FIG. 9. As described above, outer periphery of such a smooth outer periphery 15 of closure 7 has an outer diameter equal to the inner diameter of such a smooth inner periphery of roller body 6, so that any noticeable clearance will not be left between those peripheries, but they will be kept in a close and tight contact with each other.

At the next step shown in FIG. 9, a tool 23 such as a caulking tool or a chisel will strike the roller body's 6 area overlying the cavity 22 disposed near the outer periphery of closure 7. As a result, a punched hook-engagement 65 will easily be produced from rims of those struck smooth areas of roller body 6 and closure 7, so as to consist of inwardly deformed portions 60 and 61 of the members 6 and 7. In other words, intentional irregularities are produced in the said areas overlying one another in the portions of said members facing one another.

Such a punched hook-engagement 65 is a rectangular recess in plan view defined with a pair of axial sides 65a and a pair of tangential sides 65b, as shown in FIG. 5. Such a deformed portion 60 of roller body 6 fits in the deformed portion 61 of closure 7 so as to be latched thereby not to be able to move relative thereto. Those sides 65a of the punched rectangular recess 65 will prevent mutual tangential displacement of these body 6 and closure 7, whilst the other sides 65b preventing axial displacement thereof.

The connector 43 in this embodiment is also fixed to the roller body 6 in a manner similar to that just described above regarding the closure 7. In detail, this connector 43 will be introduced together with the prime mover unit 35 into said body 6. Also in this case, there will be left any noticeable clearance between the connector's outer periphery 45 and the roller body's 6 inner periphery closely surrounding the former, because they are almost of the same diameter.

In this embodiment, connector 43 is fixed to roller body 6 by the method fixing a closure 7 in the roller body 6. In addition, connector 43 will be inserted in the roller body 6 with power unit 35. As described above, the outer diameter of connector 43 is equal to the inner diameter of roller body 6, so that any noticeable clearance will not be left between those peripheries, but they will be kept in a close and tight contact with each other.

Thereafter, a region of the surface of roller body 6 superposed on the cavity 56 formed in connector 43 will be caulked in the same manner as mentioned above. Each cavity 56 also is midair and disposed near the periphery of connector 43, so that portions of those body 6 and connector 43 stacked one on another are ready to plastic deformation to produce deformed portions 62 and 63.

The roller body's deformed portion 62 fits in the connector's deformed portion 63 to provide a hook engagement 66, that is a rectangular recess defined by axial sides 65a and tangential sides 65b. These portions 62 and 63 retain one another to firmly combine the roller body 6 with the connector 43. Such a connector 43 incapable of moving relative to the roller body 6 in any direction will surely transmit torque from the motor 33 to this body.

The closure 7 is fixed to the roller body 6 of free roller 5 in quite the same manner as that of motor-installed roller 3. Plastically deformed portions 60 and 61 of these body 6 and closure 7 unite them rigidly, lest the latter should be displaced from the former or should slip off.

The motor-installed and free rollers 3 and 5 may not be employed in the roller-conveyor type transportation apparatus 1, but may be used in any other apparatus such as a belt conveyor or a winder.

The closures 7 and connector 43 may not be zinc-alloy die-cast pieces, but they 7 and 43 as well as the roller body 6 may be formed a softer aluminum alloy. Further they 6, 7 and 43 may be made of different materials, for example forming one of them 6 from a steel, with the other made by die-casting a zinc alloy for the sake of an easier and surer consolidation of them into the roller device.

The closures attached to the roller body 6 in the described embodiment are the closure 7 and connector 43, though they may be any other parts such as bearings, or motors also fixed in the roller body 6.

Each punched hook-engagement 65 and 66 need not be rectangular but may be round, polygonal such as hexagonal in plan view. The four sides themselves of each described engagement 65 and/or 66 may not be axial or tangential, but instead they may be skew such that their diagonal lines extend longitudinally or circumferentially of roller body 6.

The cavities 22 are opened in the end face of roller 3 or 5, so that it is easy to confirm their position when striking them with a tool 23, thus surely fixing the closures 7 to roller body 6 in the rollers 3 and 5.

Instead of forming the cavities 22 in the exposed outer face 16, it may be formed in the inner face 17 not exposed out from the roller body 6.

Figure 12:
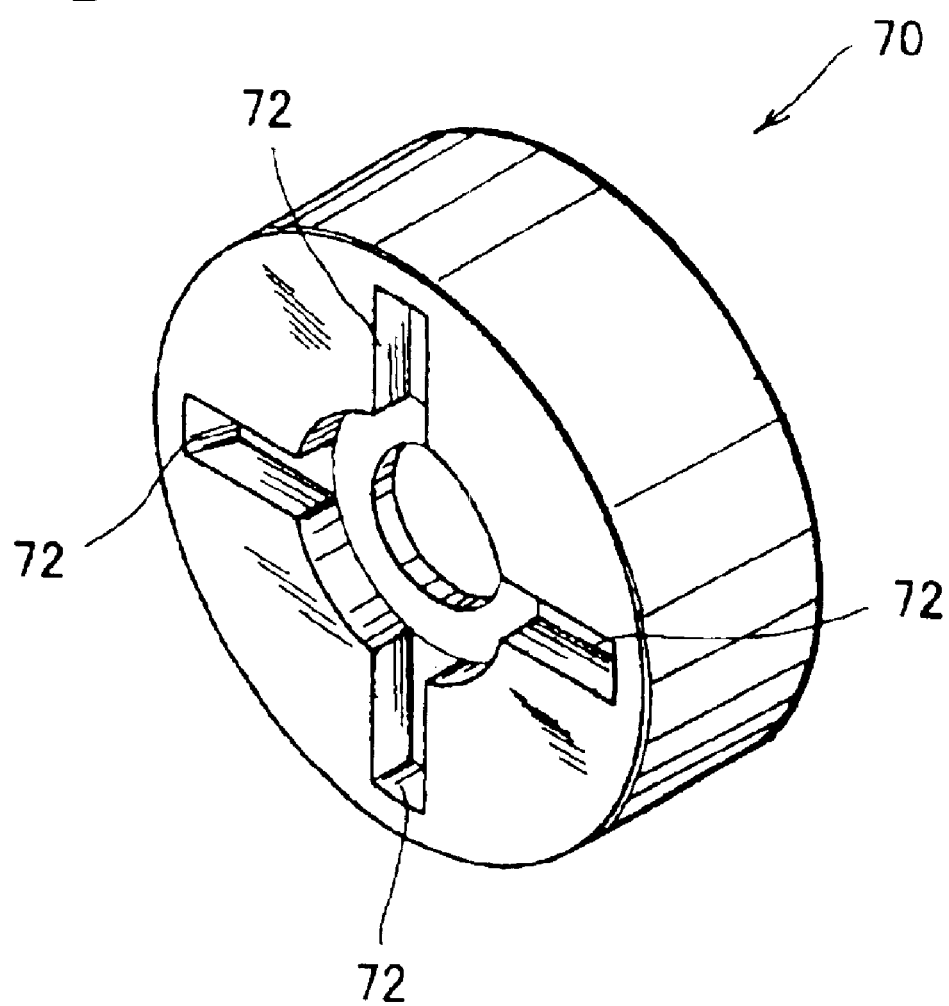
FIG. 12 is a perspective view of a modified example of the fixture that is employed in the roller device of the invention.
Figure 13:
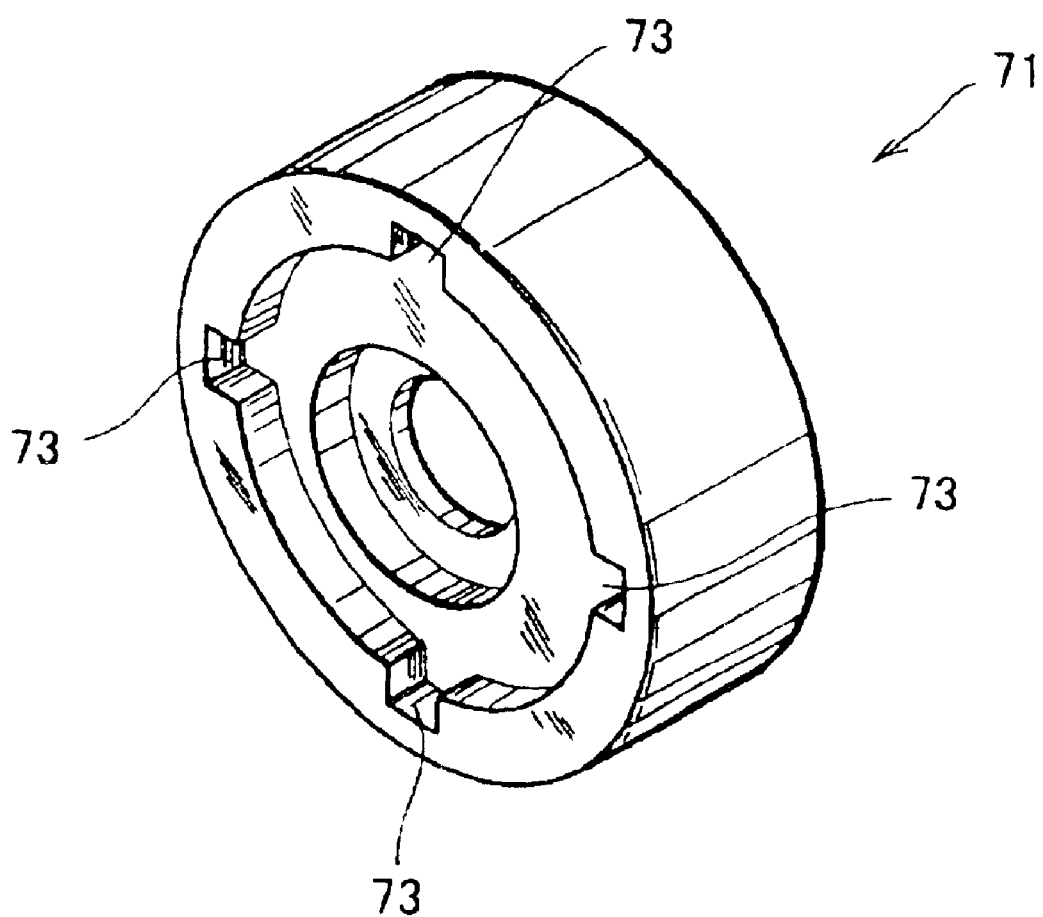
FIG. 13 is a perspective view of a further modified example of the fixture.
Figure 14:
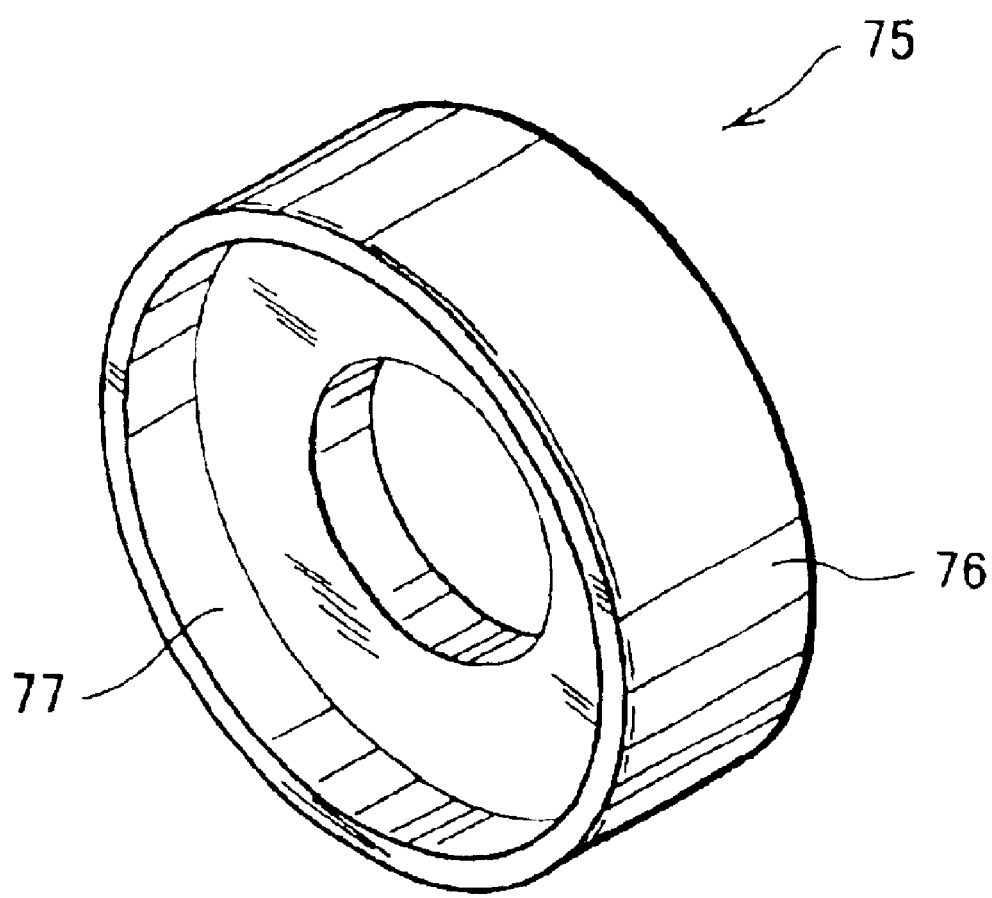
FIG. 14 is a perspective view of a still further modified example of the fixture.

Cavities 22 and 56 formed close to and in parallel with the outer periphery of closure 7 and connector 43 are disposed discretely and isolated from each other in the described embodiment, although they may communicate with each other. In each alternative closures 70 and 71 respectively shown in FIGS. 12 and 13 also for fixation in roller body 6, their cavities 72 or 73 continue to each other through a central hollow space. A further alternative closure 75 shown in FIG. 14 has a sole cavity 77 defined in and by a collar-shaped periphery 76.

One-shot plastic deformation of the superposed portions of roller body and fixture such as a closure or connector will firmly fix them not to move relative to each other, without any fear of the slipping off of such a fixture.

Any set-screw or set-pins and any preformed apertures therefor are no longer necessary, thus simplifying and economizing manufacture of roller devices.

What is claimed is:

1. A roller device comprising:
   a roller body having axially opposite first and second ends,
   a fixture accommodated at least in part in the roller body to be secured thereto to rotate as one piece with the roller body,
   at least one punched hook-engagement that is formed in and between an inner periphery of the roller body and an outer periphery of the fixture adjacent the first end of the roller body, and
   the punched hook-engagement being composed of the peripheries overlying one another that are brought into close contact with each other at least in part,
   wherein portions of said peripheries are struck inwardly and radially of the roller body so as to cause permanent and integral plastic deformation of said portions,
   the portion of the periphery of the roller body struck at a discrete location spaced axially from the first end of the roller body,
   wherein at least one cavity is preformed in the fixture and extends axially inwards a distance from an outer end face of the fixture so as to be located near the periphery thereof,
   wherein each of the plastically deformed portions constituting the punched hook-engagement projects partially or wholly into the at least one cavity.

2. A roller device as defined in claim 1, wherein the roller body has a rotational axis and further comprising at least one cavity that extends axially inwards a distance from an end face of the fixture so as to be located near the periphery thereof, and also extends a length tangentially less than 360° around the rotational axis so as to have an elongate opening in the end face.

3. A roller device as defined in claim 1, wherein the number of punched hook-engagements serving as fasteners is at least two, and the at least two punched hook-engagements are arranged at angular intervals around the roller body.

4. A roller device as defined in claim 1, wherein each punched hook-engagement assumes a generally rectangular recess in its outer appearance so that it has axial sides and tangential sides.

5. A roller device as defined in claim 1, wherein the roller body has a smooth inner peripheral surface and the fixture has a smooth outer peripheral surface, both devoid of irregularities such as corrugations, such that surface areas of the inner and outer peripheral surfaces processed to make the punched hook-engagements are held in a close and tight contact with each other.

6. A roller device as defined in claim 1, further comprising a motor installed in the roller body so that a torque necessary for the roller body to rotate is transmitted thereto from the motor.

7. A roller device as defined in claim 1, wherein the fixture is formed of a material softer than another material forming the roller body.

8. A roller device comprising:
   a roller body having a rotational axis,
   a fixture accommodated at least in part in the roller body to be secured thereto,
   at least one punched hook-engagement that is formed in and between an inner periphery of the roller body and an outer periphery of the fixture,
   at least one cavity located near the periphery of the fixture and extending less than 360° around the central axis, and
   the punched hook-engagement being composed of the peripheries overlying one another and brought into close contact with each other at least in part so that portions of said peripheries are struck inwardly and radially of the roller body so as to cause permanent and integral plastic deformation of the said portions,
   wherein each plastically deformed portion constituting the punched hook-engagement projects at least partially into the cavity.

9. A roller device as defined in claim 8, wherein the cavity extends axially inwards a distance from an outer end face of the fixture, and also extends an angle tangentially thereof so as to have an elongate opening in the end face.

10. A roller device as defined in claim 8, wherein the number of punched hook-engagements serving as fasteners is at least two, and the at least two punched hook-engagements are arranged at angular intervals around the roller body.

11. A roller device as defined in claim 8, wherein each punched hook-engagement assumes a generally rectangular recess in its outer appearance so that it has axial sides and tangential sides.

12. A roller device as defined in claim 8, wherein the roller body has a smooth inner peripheral surface and the fixture has a smooth outer peripheral surface, both devoid of irregularities such as corrugations, such that surface areas of the inner and outer peripheral surfaces processed to make the punched hook-engagements are held in a close and tight contact with each other.

13. A roller device as defined in claim 8, further comprising a motor installed in the roller body so that a torque necessary for this body to rotate is transmitted thereto from the motor.

14. A method of making a roller device comprising the steps of:

preparing a roller body having axially spaced first and second ends, preparing a fixture accommodated at least in part in the roller body to be secured thereto to rotate as one piece with the roller body and having at least one preformed cavity thereon, subsequently and preliminarily inserting the fixture into the roller body into a predetermined position where an outer surface of a periphery of the fixture and an inner surface of a periphery of the roller body have respective areas aligned and kept in contact with each other, and applying an external force inwardly in a radial direction onto the aligned areas at a discrete location spaced from each of the first and second ends so as to plastically deform said areas in unison to form at least one punched hook-engagement in and between the peripheries of the roller body and the fixture at which the roller body is deformed into the at least one cavity.

15. The method as defined in claim 14, wherein the fixture further comprises at least one cavity that extends axially so as to be located near the periphery thereof, so that at the step of applying the external force each of the plastically deformed portions constituting the punched hook-engagement projects at least partially into the said cavity.

16. The method as defined in claim 14, wherein the at least one cavity extends axially inwards a distance from an end face of the fixture so as to be located near the periphery thereof, and also extends a length tangentially thereof so as to have an elongate opening in the said face.

17. The method as defined in claim 14, wherein the number of punched hook-engagements serving as fasteners is at least two, and the at least two punched hook-engagements are arranged at angular intervals around the roller body.

18. The method as defined in claim 14, wherein each punched hook-engagement is caused at the step of applying the external force to assume a generally rectangular recess in its outer appearance so that it has axial sides and tangential sides.

19. The method as defined in claim 14, wherein the roller body has a smooth inner peripheral surface and the fixture has a smooth outer peripheral surface, both devoid of irregularities such as corrugations, and the surfaces are superposed one on another at the step of inserting the fixture, and thereafter areas of the inner and outer peripheral surfaces are processed at the step of applying the external force so as to make the punched hook-engagements that are held in a close and tight contact with each other.

20. A roller device comprising:

a roller body, a fixture accommodated at least in part in the roller body to be secured thereto, at least one punched hook-engagement that is formed in and between an inner periphery of the roller body and an outer periphery of the fixture, and the punched hook-engagement being composed of the peripheries overlying one another that are brought into close contact with each other at least in part, wherein portions of said peripheries are struck inwardly and radially of the roller body so as to cause permanent and integral plastic deformation of the said portions, wherein each punched hook-engagement assumes a generally rectangular recess in its outer appearance so that it has axial sides and tangential sides.

21. A roller device comprising:

a roller body having a rotational axis, a fixture accommodated at least in part in the roller body to be secured thereto to rotate as one piece with the roller body, at least one punched hook-engagement that is formed in and between an inner periphery of the roller body and an outer periphery of the fixture, at least one cavity preformed in the fixture and having an elongate shape with a length extending axially and located near the periphery of the fixture, and the punched hook-engagement being composed of the peripheries overlying one another and brought into close contact with each other at least in part so that portions of said peripheries are struck inwardly and radially of the roller body so as to cause permanent and integral plastic deformation of the said portions so that the roller body is deformed into the at least one cavity, wherein each plastically deformed portion constituting the punched hook-engagement projects at least partially into the cavity.

* * * * *